July 28, 1931.  A. E. GLANCY  1,816,728
OPHTHALMIC LENS
Filed March 25, 1929
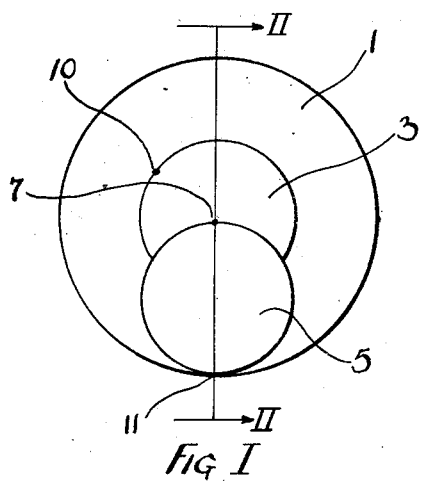
Fig I
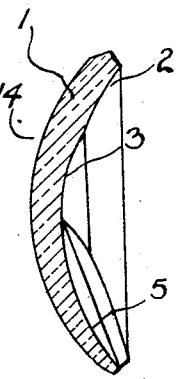
Fig II
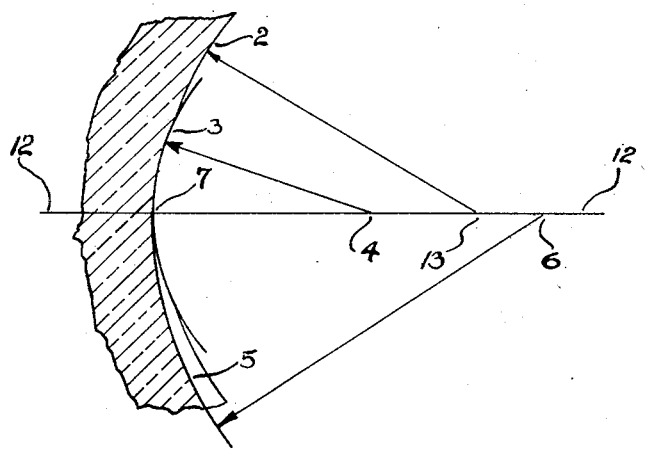
Fig III
Inventor
Anna E. Glancy
By Harry H. Styll
Attorney Patented July 28, 1931

1,816,728

UNITED STATES PATENT OFFICE

ANNA E. GLANCY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC LENS

Application filed March 25, 1929. Serial No. 349,629.

This invention relates to improvements in ophthalmic lenses and has particular reference to lenses of the multiple type having monaxial properties and to the process of producing the same.

The principal object of this invention is to provide a plurality of fields monaxially arranged in such order of powers that the wearer of multifocal lenses will be rendered universally efficient service.

Another object is to provide means whereby the field or fields most used will be of ample size and not limited by an unnecessarily large field for those of lesser use.

Another object is to form the lens with the improved features in a simple and economical manner.

Another object is to eliminate where possible the distressing jump or displacement of image when the eye passes from one field to another.

Another object is to provide eyes having little or no accommodation with suitable and efficient correction.

Other objects and advantages will become apparent from the following description taken in connection with the accompanying drawings, and it will be apparent that many changes may be made in the details of construction, arrangement of parts and steps of the process without departing from the spirit of the invention as expressed in the accompanying claims. I, therefore, do not wish to be limited to the exact details shown and described as the preferred forms only have been shown by way of illustration.

In the drawings:

Fig. I is a front view of a lens embodying the invention;

Fig. II is a section on line II—II of Fig. I;

Fig. III is an enlarged diagrammatic sectional view of a portion of a blank showing the relationship of the curves.

This invention is intended to accomplish in a simple manner many improvements in corrective lenses particularly those prescribed for cases where the accommodation of the eyes is weak or absent. As is well known, if the crystalline lens of the eye cannot move enough to accommodate varying focal distances or if this lens is absent as in the condition known as "aphakia" caused by cataract, a multifocal lens is a necessity. In my invention the presbyopic or cataract case has the fields in the position of greatest use and of a size corresponding to their importance. The distance field is ample for the amount of use given it but the intermediate and reading fields have been made of first importance and duly amplified to widen their scope.

In a small room or office the presbyopic or cataract case can use the reading field in the usual way and in viewing a caller or object at a short distance the intermediate field is entered by merely turning the eyes obliquely. In this connection it will be understood that the monaxial properties of the lens are of great use inasmuch as the jump or displacement of image is greatly reduced and in a certain position entirely eliminated. This combination of improved features serves to make this lens of great benefit to all users of multifocal lenses and is of prime importance and universal use to sufferers from presbyopia or aphakia.

Referring to the drawings wherein similar characters of reference denote corresponding parts throughout the several views, the numeral 1 denotes the blank upon which I form my monaxial lens. The blank 1 is preferably formed to the shape desired, such as a meniscus, by molding or other suitable method. As I desire to form the curves upon the concave side for the purpose of this description I mount the blank in the usual way with the concave side exposed. It will be understood, however, that the fields can be formed on the convex side with equal facility. Having mounted the blank 1 in a suitable abrading machine I grind and polish a curve 2 over the entire face thus forming my intermediate field.

It will be observed from Fig. III that the radius of this curve is struck from the axial line 12—12 with its center at point 13. The curves desired for the various fields having been computed in the usual way, I next form the distance field 3 which has its center 4 upon the same axial line as the intermediate field 2. I next grind and polish a third field 5 having its center of curvature 6 also on the same line as the other two centers. This third field 5 forms the reading portion of the lens and is located with its upper edge tangential with the center of the other two fields at point 7.

It will be apparent that all the necessary features of a monaxial lens are present as the centers of curvature all fall on one axial line and the upper line of joinder of the reading field also passes through the center of the other two fields. At point 7 the change in prism will be nil and at the other portions of the lens where one field joins another the prismatic displacement will be small and negligible.

As an example of the prism change we can assume the intermediate addition to be plus 1 diopter with a reading addition of plus 3 diopters. If the outside diameter of the lens is 40 millimeters, the diameter of the distance portion 20 millimeters and the diameter of the reading field 20 millimeters, then at any point 10, Fig. 1, on the boundary between the distance and intermediate portions the prism change is 1 prism diopter. There is no prism change in passing through the boundary at 7 as previously stated. At the lowest edge of the lens at point 11 the reading portion will be sunk below the intermediate field to a depth of 1.6 millimeters. It will readily be seen that an improved type of lens has been devised wherein three fields are truly monaxial. Having thus formed my monaxial blank I can finish the prescription curve 14 on the opposite side to give the desired power. My lens can then be cut, edged and bevelled to shape it to the mounting into which it is desired to place it. In the use of the improved lens the reading field is in the most convenient position to serve its purpose and the eye travelling directly upwards is immediately into the distance field without jump or displacement of image.

As the distance field is not greatly used in enclosed places, such as offices, I have provided a large intermediate field partly surrounding the reading field so that an oblique turn of the eyes from the reading field will immediately bring into focus any object within the intermediate field.

The process of making this lens is of a simple and economical nature as a single piece of glass is used to form all the fields upon.

From the foregoing it will be seen that I have provided a novel lens embodying improvements calculated to be of great benefit to multifocal wearers and the means of carrying out these objects are of an efficient and economical nature.

Having described my invention, I claim:

1. A blank for a multifocal lens comprising a focal field of one power partially surrounding a second field of a different power, the center of curvature of both fields lying on the same axial line, a third field contained in both the other fields, the center of curvature of said third field lying on the same axial line as the centers of curvature of the other two fields and having its upper line of joinder passing through the common center of said other two fields.

2. A multifocal lens comprising two concentric focal fields, the inner field having distance power and the outer field intermediate power and a third focal field having reading power imposed upon the other two fields and extending from a point adjacent the center of the concentric fields across both fields towards the bottom of the lens.

3. A multifocal lens comprising two concentric focal fields, the inner field having distance power and the outer field intermediate power and a third focal field having reading power imposed upon the other two fields and extending from a point adjacent the center of the concentric fields across both fields towards the bottom of the lens and the center of curvature of the distance field lying on a straight line passing through the centers of curvature of the intermediate and reading power fields.

ANNA E. GLANCY.